US011840270B2

(12) United States Patent
Holleis

(10) Patent No.: US 11,840,270 B2
(45) Date of Patent: Dec. 12, 2023

(54) PUSHCHAIR SEAT AND PUSHCHAIR SYSTEM

(71) Applicant: CYBEX GmbH, Bayreuth (DE)

(72) Inventor: Ralf Holleis, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 211 days.

(21) Appl. No.: 16/756,786

(22) PCT Filed: Oct. 15, 2018

(86) PCT No.: PCT/EP2018/078109
§ 371 (c)(1),
(2) Date: Apr. 16, 2020

(87) PCT Pub. No.: WO2019/076831
PCT Pub. Date: Apr. 25, 2019

(65) Prior Publication Data
US 2020/0239053 A1    Jul. 30, 2020

(30) Foreign Application Priority Data

Oct. 16, 2017 (DE) .................... 20 2017 106 245.7

(51) Int. Cl.
*B62B 3/02* (2006.01)
*A47C 4/00* (2006.01)

(52) U.S. Cl.
CPC . *B62B 3/02* (2013.01); *A47C 4/00* (2013.01)

(58) Field of Classification Search
CPC ..... B62B 3/02; A47C 4/00; B60N 2002/2896; B60N 2/2848; B60N 2/2878
See application file for complete search history.

(56) References Cited

U.S. PATENT DOCUMENTS

| 5,255,934 A | * | 10/1993 | Wilson | A61G 5/045 |
| | | | | 180/907 |
| 2007/0145723 A1 | * | 6/2007 | Kamara | A61G 5/08 |
| | | | | 280/647 |
| 2011/0012324 A1 | | 1/2011 | Yeh et al. | |
| 2011/0309658 A1 | | 12/2011 | Carimati Di Carimate et al. | |

FOREIGN PATENT DOCUMENTS

| AT | 95803 B | | 1/1924 |
| AT | 95803 B | * | 7/1924 |
| CN | 201183515 Y | | 1/2009 |

(Continued)

OTHER PUBLICATIONS

"International Application No. PCT/EP2018/078109, International Search Report and Written Opinion dated Feb. 1, 2019", (Feb. 1, 2019), 16 pgs.

(Continued)

*Primary Examiner* — James A English
*Assistant Examiner* — James J Triggs
(74) *Attorney, Agent, or Firm* — Schwegman Lundberg & Woessner, P.A.

(57) ABSTRACT

A pushchair seat for mounting on a pushchair chassis is comprised of a seating surface and a backrest, wherein the backrest has a distal section and a proximal section which can be rotated relative to the distal section in such a way that the backrest can be folded up from an unfolded backrest usage position into a collapsed backrest storage position.

22 Claims, 4 Drawing Sheets

(56) References Cited

FOREIGN PATENT DOCUMENTS

Figure 2:
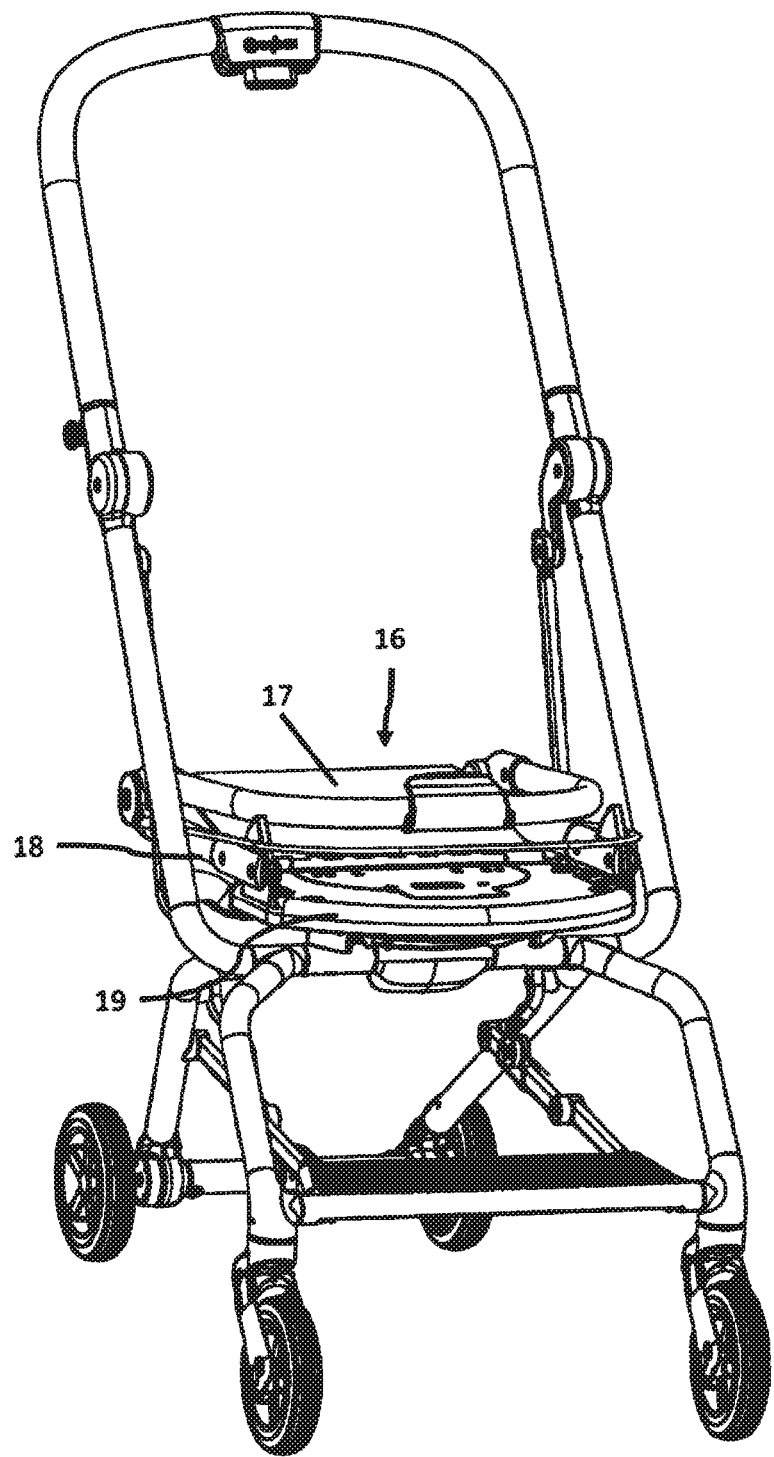

| | | |
|---|---|---|
| CN | 101439686 A | 5/2009 |
| CN | 205854238 U | 1/2017 |
| DE | 10130430 A1 | 1/2003 |
| DE | 102007047700 A1 | 4/2009 |
| DE | 102007055144 A1 | 5/2009 |
| DE | 202017100792 | 3/2017 |
| EP | 2275321 A2 | 1/2011 |
| EP | 2907724 A1 | 8/2015 |
| EP | 2957479 A2 | 12/2015 |
| EP | 2895376 B1 | 11/2016 |
| EP | 3269618 A1 | 1/2018 |
| JP | S53108061 U | 8/1978 |
| JP | 2013244942 A | 12/2013 |
| WO | WO-2019076831 A1 | 4/2019 |

OTHER PUBLICATIONS

"International Application No. PCT/EP2018/078109, International Preliminary Report on Patentability dated Apr. 30, 2020", 7 pgs.
"Chinese Application No. 201880067065.4, First Office Action dated Feb. 11, 2022", (Feb. 11, 2022), 18 pgs.
"Japanese Application No. 2020-521327, Notice of Reasons for Refusal dated Jul. 19, 2022", (Jul. 19, 2022), 8 pgs.
"Korean Application No. 10-2020-7013785, Office Action dated Aug. 31, 2023", (Aug. 31, 2023), 14 pgs.

\* cited by examiner

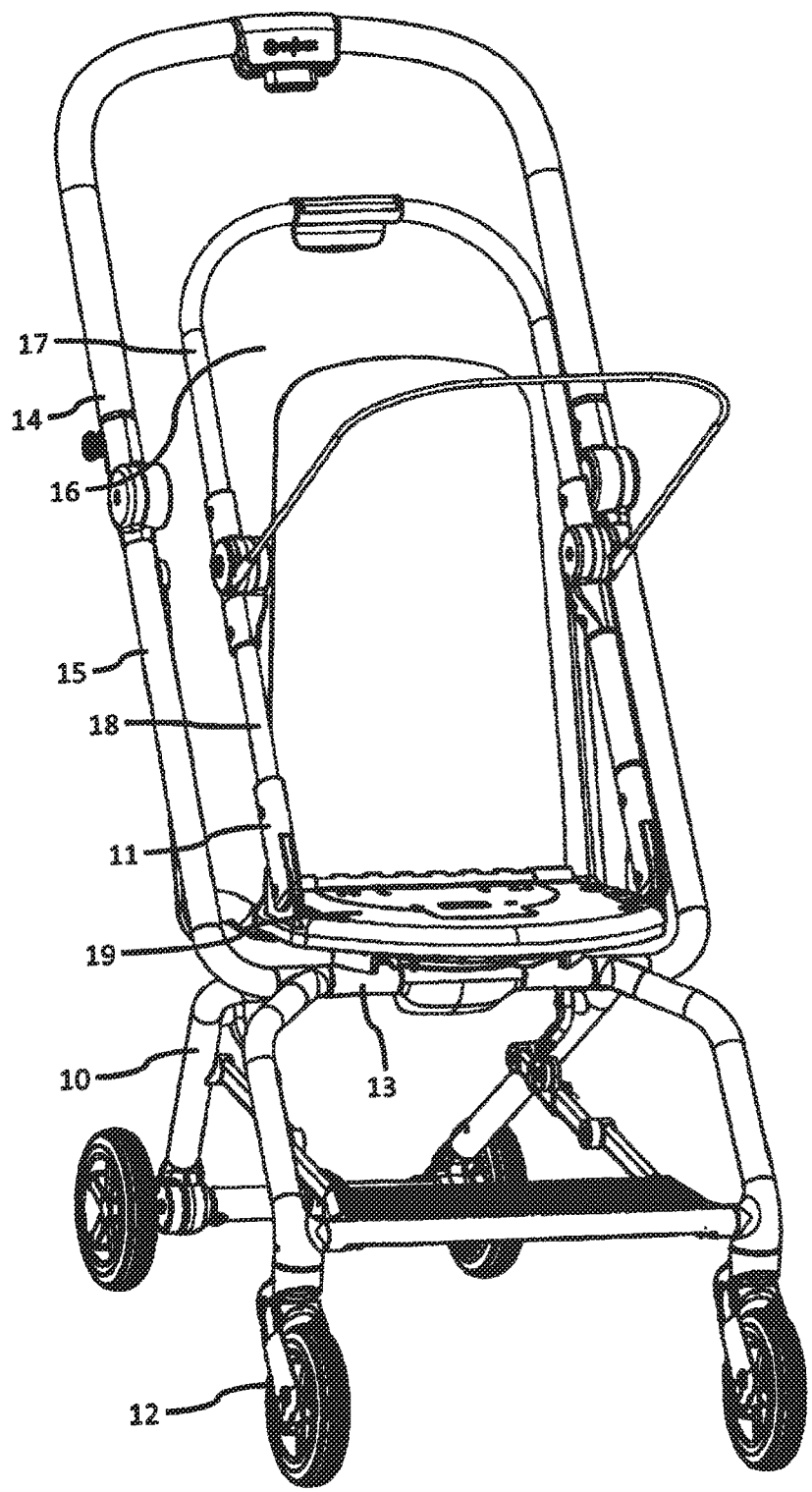
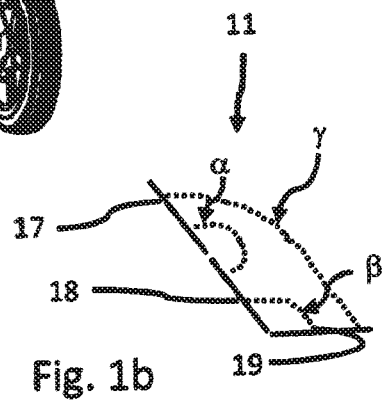
Fig. 1a
Fig. 1b

PUSHCHAIR SEAT AND PUSHCHAIR SYSTEM

PRIORITY CLAIM TO RELATED APPLICATIONS

This application is a U.S. national stage filing under 35 U.S.C. § 371 from International Application No. PCT/EP2018/078109, filed on 15 Oct. 2018, and published as WO2019/076831 on 25 Apr. 2019, which claims the benefit under 35 U.S.C. 119 to German Application No. 20 2017 106 245.7, filed on 16 Oct. 2017, the benefit of priority of each of which is claimed herein, and which applications and publication are hereby incorporated herein by reference in their entirety.

The invention relates to a pushchair seat and a pushchair system.

Folding pushchair chassis, for example from EP 2 957 479 A2, are already known from the prior art. Furthermore, removable pushchair seats are known, for example from EP 2 895 376 B1, which are foldable. By means of such solutions, the pushchairs (or components thereof) can be transferred to a compact storage position, in which they can be stored or transported, for example. However, solutions proposed in the prior art are still generally perceived as comparatively complicated to operate and comparatively inflexible.

It is therefore the object of the invention to propose a pushchair seat or pushchair system (comprising a pushchair seat and a pushchair chassis), wherein simple operation is to be ensured with a high degree of flexibility and variability in order to enable a compact storage position. In particular, one-hand operation and/or handling requiring only one operation should be possible.

In order to solve the aforementioned problem, a pushchair seat with the features of claim 1 is proposed.

In particular, the object is solved by a pushchair seat for mounting on a pushchair chassis, comprising a seating surface and a backrest, wherein the backrest has a distal section and a proximal section rotatable (pivotable) (about a first axis) relative to the distal section such that the backrest is foldable up from an unfolded backrest usage position to a folded backrest storage position.

A central idea of the invention is to propose a foldable backrest. In particular, folding means that an angle between the proximal and distal sections is (significantly) reduced, for example by at least 50% or at least 90% (e.g. from 180° to less than 10°). The backrest usage position shall be characterized in that in this position of the backrest a child can be accommodated in the pushchair seat so that the pushchair seat can be used. In particular, the backrest storage position is characterized in that in this position of the backrest no more child can be accommodated in the pushchair seat. This is therefore a position which the pushchair seat usefully assumes for storage and/or transport. Preferably, the pushchair seat can be detachably mounted on the pushchair chassis. In a preferred embodiment, the pushchair seat may remain on the pushchair chassis when the backrest is folded (i.e. it may at least be in contact with the pushchair chassis, in particular it may be attached to the pushchair chassis at least in sections).

The proximal section is a section of the backrest that is closer to the seating surface (in the usage position) or a section that accommodates a lower back section of the child. The distal section, on the other hand, is further away from the seating surface and is designed to support the upper back or shoulders (or head) of the child.

The proximal section is preferably rotatable in relation to the seating surface of the pushchair seat (about a second axis which is offset to the first axis and extends in particular parallel thereto) in such a way that the pushchair seat can be transferred from an upright proximal section usage position to a flattened proximal section storage position. In this embodiment, the backrest is (at least) divided into two parts, wherein the distal section of the backrest is rotatably connected to the proximal section of the backrest about a first axis. The proximal section of the backrest is rotatably connected to the seating surface about a second axis (at least substantially parallel to the first axis), wherein the second axis is closer to the seating surface than the first axis.

By rotating the proximal section in relation to the seating surface, it is also possible to optionally adjust the inclination of the backrest, for example to improve the seating comfort for the child. Even in the proximal section storage position, it would be conceivable in principle (at least if it is possible for the backrest to be in the backrest usage position) that a child is accommodated. However, it is preferable that the child cannot be accommodated in the flattened proximal section storage position (for example, because this position can only be assumed when the backrest is in the backrest storage position). If necessary, various mechanisms can also be provided for flattening the pushchair seat (i.e. transferring it to a lying position) to increase the child's comfort on the one hand and for adjusting the flattened pushchair seat storage position on the other hand (in which the backrest is also in the backrest storage position). Basically, the terms backrest usage position and backrest storage position refer to the relative positioning of the proximal and distal sections of the backrest to each other, whereas proximal section usage position and proximal section storage position refer to a relative positioning of the proximal section of the backrest to the seating surface of the pushchair seat. It is therefore not excluded (but preferably the case) that the backrest in the proximal section storage position is also in the backrest storage position.

Preferably, a length of the distal section is at least 0.5 times, more preferably at least 0.8 times, the length of the proximal section. Furthermore, a length of the distal section can be at most 1.5 times, preferably at most 1.2 times, as great as a length of the proximal section. In particular, the distal and proximal sections of the backrest may be of (approximately) the same length. All in all, a compact backrest storage position can thus be set.

An angle between the proximal section and the distal section of the backrest is (unless otherwise specified) the smaller angle between two mathematically conceivable angles between the proximal and distal sections. For example, if the distal section (with the proximal section fixed) is pivoted backwards (away from a surface on which the child is resting), the angle between the distal and proximal position could basically be described as either 270° or 90°. According to the above definition, this should be a 90° angle, unless otherwise specified. If specific angle designations are given, the angle α should be an angle between the distal and proximal section, the angle ß an angle between the proximal section and the seating surface, and the angle γ an angle between the distal section and the seating surface or the respective imaginary extensions thereof. The angles ß and γ, unless otherwise specified, shall in particular be the angles between the sides of the surfaces against which a child would rest in the usage position of the seat.

Preferably the proximal section and the distal section in the backrest usage position enclose an angle of at least 170°, preferably (at least approximately) 180°.

The proximal section and the distal section may form an angle of less than 20°, preferably less than 8°, more preferably (at least approximately) adjacent to each other in the backrest storage position.

The proximal section and the seating surface can include an angle of 90° to 180° in the proximal section usage position (optionally, variably adjustable).

The proximal section and the seating surface may, in the pushchair storage position, enclose an angle of more than 150°, preferably more than 170°, more preferably (at least approximately) 180° or enclose less than 20°, preferably less than 8°, more preferably at least approximately adjacent to each other.

In an embodiment, the pushchair seat may be configured so that a rotation of the distal section relative to the proximal section to fold the backrest occurs before and/or at least partially during and/or after rotation of the proximal section relative to the seating surface to flatten the pushchair seat. Especially when the two rotations take place at least partially at the same time, a compact position of the pushchair seat can easily be achieved.

In one embodiment, the distal section can be rotated forwards on the one hand or backwards or downwards on the other hand in relation to the proximal section for folding into the backrest usage position. A (relative) rotation forwards means, in particular, an approach of the respective surfaces of the sections involved which accommodate the child (in the usage position). By rotating forward, folding up can be made possible in a simple way.

Proximal and distal sections can be locked together in the backrest usage position and/or in the backrest storage position. Alternatively or additionally, the proximal section and seating surface can be locked against each other in the proximal section usage position and/or in the proximal section storage position.

In a preferred embodiment, locking of the proximal section with respect to the seating surface can be achieved and/or released by (possibly exclusively) rotating the distal section with respect to the proximal section. Alternatively or additionally, a locking of the proximal section with respect to the distal section can be realized (adjusted) and/or released by a manual actuating device. This can further simplify the operation.

The above-mentioned object is further solved by a pushchair system comprising a pushchair chassis and a pushchair seat of the above type, wherein the pushchair seat is preferably detachably mounted or mountable (from the pushchair chassis) and/or is rotatable with respect to the pushchair chassis (10) about an (at least substantially) vertical axis. The pushchair chassis is preferably (also) foldable.

Transferring the backrest to the backrest storage position and/or transferring the proximal section to the proximal section storage position can preferably be carried with the pushchair seat mounted on the pushchair chassis (especially without folding the pushchair chassis itself). Preferably, the pushchair chassis can remain in a position in which it can still be used (for example, in a position in which it can still be used, in particular in the maximum unfolded position). This further improves the flexibility and variability of operation.

Preferably, the pushchair seat can be configured in different orientations on the pushchair chassis (especially in a forward orientation where the child looks away from different people to a backward orientation where the child looks towards the different people). To set the different configurations (e.g. forward orientation and backward orientation), the pushchair seat may be accordingly removable (and for example rotated 180°) and remountable in another position. However, it is also conceivable that, in such a reconfiguration, the pushchair seat could in principle remain on the pushchair chassis (for which purpose a corresponding rotation mechanism may then be provided). All in all, the rotation described here is a rotation about an axis which is (at least essentially) vertical.

Furthermore, the pushchair seat (in its entirety) may be rotatable relative to the pushchair chassis about an (at least substantially) horizontal axis, preferably by an angle of 60° to 120°, more preferably (at least approximately) 90°, especially when the pushchair chassis is folded. This allows the pushchair system to be configured in a particularly compact way. Specifically, the seating surface can be mounted on a frame part of the pushchair chassis so as to be pivotable (about an at least substantially horizontal axis). Furthermore, a corresponding pivoting mechanism can be configured in such a way that when the pushchair chassis is folded (optionally triggered by the folding process), the pushchair seat rotates relative to the pushchair chassis.

In one embodiment, when the pushchair chassis is folded, the pushchair seat can be partially or fully accommodated within an envelope surface of the pushchair chassis. In this type of embodiment, no additional (construction) space is required for the pushchair seat, which allows for extremely compact storage of the pushchair system.

In the usage position of the child seat, a seating surface (which may be optionally extended in an imaginary manner) and the proximal section of the backrest preferably form an angle $ß_g$ (wherein the index "g" here and hereafter stands for usage position) of between 90° and 180°, while the distal section of the backrest may face (substantially) in the same direction as the proximal section and, continuing the latter, is attached to an end remote from the seating surface, thus enclosing an angle $\alpha_g$ of between 160° and 180° with the distal section and (optionally by its imaginary extension) an angle $\gamma_g$ with the seating surface (optionally its imaginary extension). In the storage position of the child seat, the seating surface and both sections of the backrest can (essentially) have the same orientation, wherein the proximal section of the backrest optionally overlaps the seating surface at least in sections, and wherein the two sections of the backrest possibly overlaps at least in sections, preferably at least almost completely.

To transfer the child seat from the usage to storage position, the distal section of the backrest can be rotated in a first rotation through (at least approximately) 180° about the first axis of rotation. Before, after or at least partially overlapping in time the proximal section (if necessary together with the distal section connected to it) can be rotated through a further angle in a second rotation about the second axis, preferably opposite to the first rotation.

In a preferred embodiment, the distal section is rotated relative to the proximal section (by an angle $\Delta\alpha$ of at least approximately) 180° and the proximal section is rotated relative to the seating surface or an imaginary extension of the latter backwards or downwards (preferably by $\Delta ß$=at least approximately $180°-\gamma_g$). The angle $\gamma$ between the distal section and the seating surface (optionally the respective imaginary extensions) therefore changes by $\Delta\gamma$ between 90° and 180°.

In an alternative embodiment, the distal section is rotated backwards or downwards relative to the proximal section (by an angle $\Delta\alpha$ of at least approximately 180°) and the proximal section is rotated relative to the seating surface or an imaginary extension thereof (preferably by Δß=at least approximately 180°−$\gamma_g$). The angle γ between the distal section and the seating surface (optionally the respective imaginary extensions) changes by Δγ between 0° and 90°.

Preferably, the (backrest and/or proximal section) usage position can be locked. Then, as an optional first step, the locking of the distal section against the proximal section can be released and a rotation of the distal section initiated. Furthermore, simultaneously or (only) after at least partial or preferably only partial (optionally complete) rotation of the distal section, the locking of the proximal section against the seating surface can be released, so that during or after further rotation of the distal section, the proximal section can also rotate (relative to the seating surface). In this process, one of the two sections can stop its rotation before the other section, or both sections can stop their rotation at the same time. In a preferred embodiment, the rotations of the distal section relative to the proximal section and of the proximal section relative to the seating surface run simultaneously, wherein the one rotation can be forced by the other. In a concrete embodiment, this can be realized, for example, by a four-bar joint, one side of which is formed by at least one section of the seating surface and the second side, adjacent to the first side, is formed by at least one section of the proximal section. A concrete mechanism for this can be found in DE 20 2017 100 792 U1. It describes a corresponding mechanism for a frame of the pushchair disclosed there (comprising a central release mechanism in a horizontal section of a frame of the backrest and a transmission via Bowden cables).

The child seat can optionally also be locked or locked in the (backrest and/or proximal section) storage position. Any locking, especially that of the respective usage position, may be provided or necessary to release a double action (i.e. in particular the successive or simultaneous execution of two operations). Furthermore, the seat can optionally have a rotating mechanism, for example the mechanism disclosed in CN 201 183 515 Y.

Furthermore, the seat can be designed as a hanging seat, i.e. at least in the area of the backrest without rigid parts (from a circumferential frame). In such an embodiment, the hanging seat can, for example, be made of textile or another suitable material, which can be stiffened with inserts (e.g. two plastic, in particular polyethylene, inserts which are advantageously hinged together).

In a preferred application, the seat according to the invention may be attached to a foldable pushchair chassis. It may be further preferably provided that the entire pushchair seat or a seating surface thereof rotates about a predetermined angle of preferably (at least approximately) 90° (relative to a pushchair seat bearing section) when the pushchair chassis is folded, so that the entirety of the pushchair seat in the storage position and the folded pushchair chassis is particularly compact and the pushchair seat (entirely or partially) is located within a volume (defined by an envelope surface) of the folded pushchair chassis.

Preferably, the pushchair seat according to the invention is5 used with a rotating mechanism on a foldable pushchair chassis. If the transfer of the pushchair seat to the storage position and the folding of the pushchair chassis are independent of each other, an inexpensive pushchair can be provided which can be folded compactly in a very simple way both when the seat is facing in the direction of travel and when facing in the opposite direction.

Further embodiments will become apparent from the subclaims.

Figure 3:
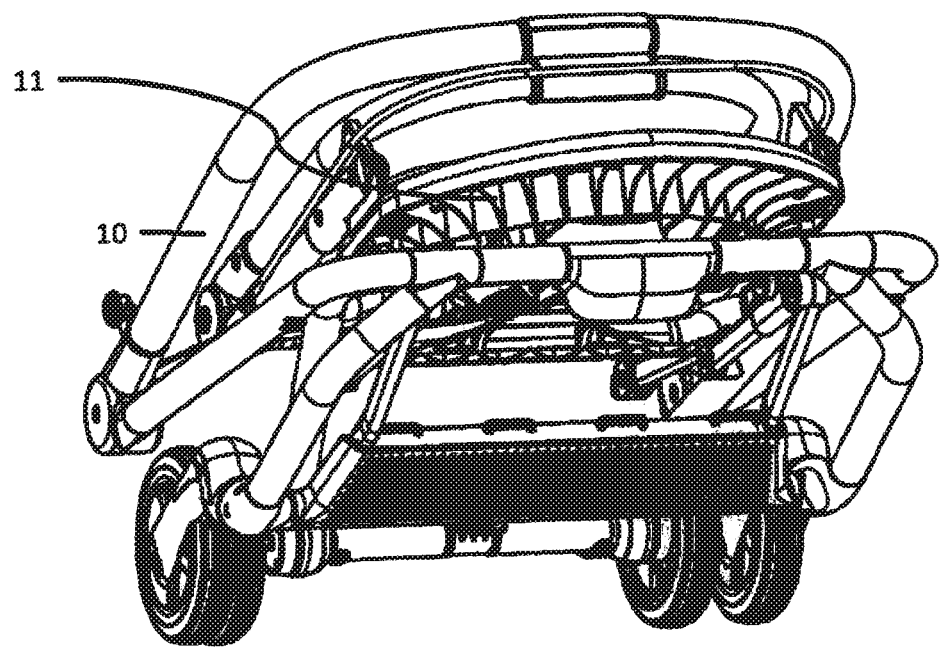
Figure 4:
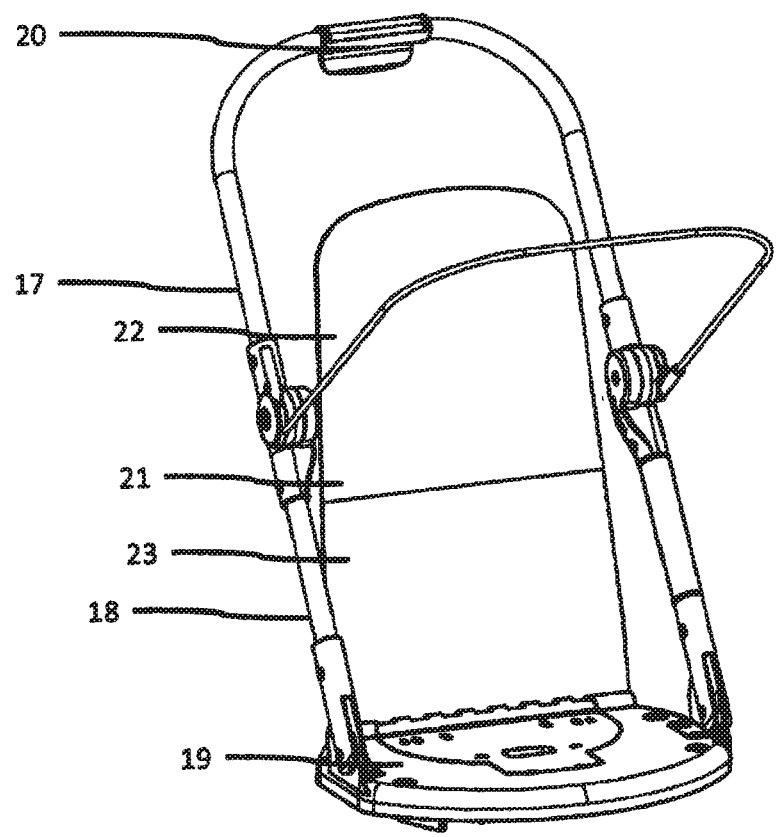
Figure 5:
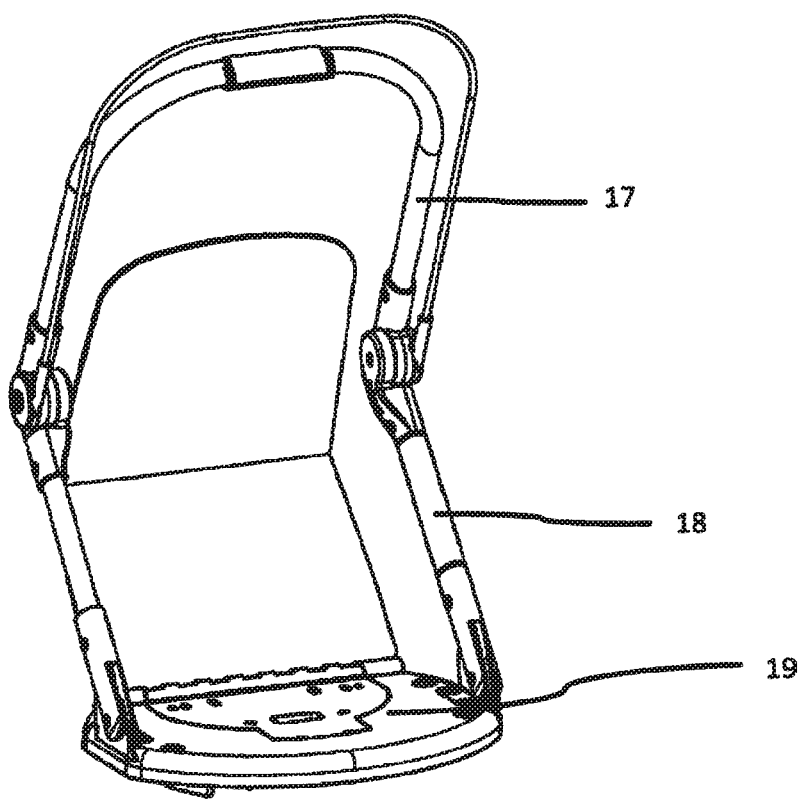
Figure 6:
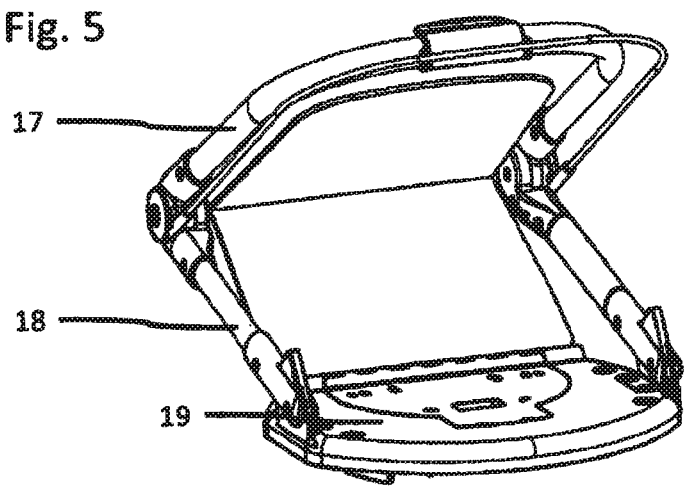
Figure 7:
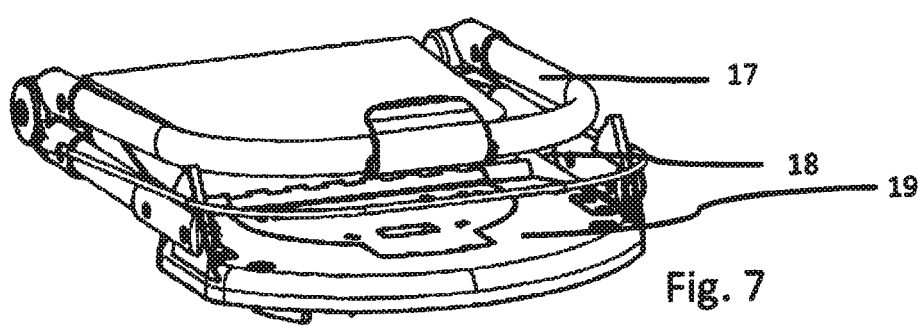

In the following, the invention is described by means of an embodiment example, which is explained in more detail by means of the drawings, wherein:

FIG. 1a shows a pushchair in a first position;
FIG. 1b shows a schematic representation of the pushchair seat according to the invention;
FIG. 2 shows the pushchair according to FIG. 1a in a second position;
FIG. 3 shows the pushchair according to FIG. 1a in a third position;
FIG. 4 shows a pushchair seat of the pushchair as shown in FIG. 1a in a first position;
FIG. 5 shows the pushchair seat as shown in FIG. 4 in a second position;
FIG. 6 shows the pushchair seat as shown in FIG. 4 in a third position; and
FIG. 7 shows the pushchair seat according to FIG. 4 in a fourth position.

In the following description, the same reference numbers are used for identical and equivalent parts.

FIG. 1a shows a pushchair according to the invention (without upholstery). The pushchair includes a pushchair chassis 10 and a pushchair seat 11 (without upholstery). The pushchair chassis 10 comprises a frame-like construction and (in this case four) wheels 12, while the pushchair seat 11 is mounted on a bearing 13 (in this case comprising a horizontal strut or tube). From this bearing, the pushchair seat 11 can be removed (and repositioned, for example, rotated through 180°) so that both a forward driving position (as shown in FIG. 1a) and a reverse driving position can be set. Both the pushchair chassis 10 and the pushchair seat 11 are designed to be foldable (each separately). The pushchair chassis 10 can, for example, be folded in the same way as the printed publication DE 20 2017 100 792 U1. In concrete terms, this can be done by moving the front wheels towards the rear wheels so that they are close to each other (possibly arranged in a line). Furthermore, a distal slider section 14 can be pivoted in relation to a proximal slider section 15. A folded position is shown in FIG. 3.

Furthermore, a backrest 16 of the pushchair seat 11 has a distal section 17 and a proximal section 18, wherein the distal section 17 can be pivoted in relation to the proximal section 18 (as explained in detail below) or is articulated to it. Furthermore, the pushchair seat 11 has a seating surface 19.

As shown in FIG. 2, the distal section 17 can be pivoted (forward) in relation to the proximal section 18 of the backrest 16 until it rests against the proximal section in its end position (as shown in FIG. 2). At the same time (or partially overlapping in time), the proximal section 18 can pivot (backwards) relative to the seating surface 19, so that it assumes the position according to FIG. 2, in which it is (at least essentially) aligned parallel to the seating surface (but facing away from it).

As can be seen in FIG. 3, the pushchair seat 11 is (completely) accommodated within a volume (defined by an envelope surface) of the pushchair chassis 10. Overall, a compact storage position can therefore be achieved.

FIGS. 4 to 7 explain in particular how to move the pushchair seat from a usage position (according to FIG. 4) to a storage position (according to FIG. 7). In the position according to FIG. 4, a child could be accommodated and the pushchair used accordingly. To transfer the pushchair seat into the storage position according to FIG. 7, a (manual) actuating device 20 is first actuated so that a lock of the distal section 17 in relation to the proximal section 18 is released so that the distal section 17 can be pivoted in relation to the proximal section 18 (forwards by an angle ß₁ with $ß_1 < ß_g$, see FIG. 1a for definition of angle). As can be seen from FIGS. 4 and 5, the proximal section 18 initially remains in a constant position relative to the seating surface 19 (in which the proximal section 18 is locked relative to the seating surface 19). If the distal section 17, starting from the position according to FIG. 5, is now pivoted further relative to the proximal section 18 (forwards, by an angle ß₁ with ß₁ plus 32 at least approximately equal to $ß_g$, see FIG. 1a for definition of angle), this pivoting movement releases the locking between the proximal section 18 and the seating surface 19, so that during a further pivoting movement (see FIG. 6) of the distal section 17 in relation to the proximal section 18, the proximal section 18 is also pivoted in relation to the seating surface 19 (backwards, by an angle Δα at least approximately equal to $α_g$, see FIG. 1a for definition of angle). Overall, the distal section 17 is pivoted relative to the seating surface 19 by an angle Δγ at least approximately equal to $γ_g$ (forwards, see FIG. 1a for definition of angle). The final position is then shown in FIG. 7.

Furthermore, FIGS. 4 to 7 show how the angle α between distal section 17 and proximal section 18 is successively reduced (starting from at least approximately 180°) (down to at least approximately 0° or an angle of at least less than 10°). Overlapping in time (in a period of time illustrated by the positions according to FIGS. 5 to 7), the angle ß between the proximal section and a plane defined by the seating surface is also reduced to 0° (at least approximately). The mechanism described in FIGS. 4 to 7 can also correspond to the mechanism described in DE 20 2017 100 792 U1 (there for the pushchair chassis). Other solutions are of course conceivable.

The element 21 (see for example FIG. 4) may be a reinforcing element provided within an upholstery (not shown), which is therefore also pivoted together with the pivoting of the entire backrest. This element can also preferably have a distal element section 22 and a proximal element section 23 (see FIG. 4).

It should be noted at this point that all the parts described above, considered in isolation, and in any combination, in particular the details shown in the drawings, are claimed to be essential to the invention. Modifications of this are familiar to the person skilled in the art.

LIST OF REFERENCE NUMERALS

10 Pushchair chassis
11 Pushchair seat
12 Wheel
13 Bearing
14 Distal slider section
15 Proximal slider section
16 Backrest
17 Distal section
18 Proximal section
19 Seating surface
20 (Manual) actuating device
21 Element
22 Distal element section
23 Proximal element section

The invention claimed is:

1. A pushchair seat for mounting on a pushchair chassis, the pushchair seat comprising:
   a seating surface; and
   a backrest,
   wherein the backrest has a distal section and a proximal section rotatable relative to the distal section, such that the backrest is foldable from an unfolded backrest usage position to a folded backrest storage position,
   wherein the pushchair seat is configured such that a rotation of the distal section relative to the proximal section for folding the backrest occurs before a rotation of the proximal section relative to the seating surface for flattening the pushchair seat or a rotation of the distal section relative to the proximal section for folding the backrest occurs at least partially overlapping in time during a rotation of the proximal section relative to the seating surface for flattening the pushchair seat or a rotation of the distal section relative to the proximal section for folding the backrest occurs after a rotation of the proximal section relative to the seating surface for flattening the pushchair seat, and wherein in the backrest storage position, the proximal section is disposed between the distal section and the seating surface, and
   wherein a locking of the proximal section relative to the seating surface is adjusted or released by a rotation of the distal section relative to the proximal section or wherein a locking of the proximal section relative to the distal section can be adjusted or released by a manual actuating device.

2. The pushchair seat according to claim 1, wherein the proximal section is rotatable relative to the seating surface of the pushchair seat, such that the proximal section can be transferred from an upright proximal section usage position to a flattened proximal section storage position.

3. The pushchair seat according to claim 1, wherein a length of the distal section is 0.5 to 1.5 times a length of the proximal section.

4. The pushchair seat according to claim 2, wherein the proximal section and the distal section in the backrest usage position enclose an angle of at least 170°, or the proximal section and the distal section in the backrest storage position enclose an angle of less than 20°.

5. The pushchair seat according to claim 1, wherein for folding into the backrest usage position the distal section is rotatable forward relative to the proximal section or the distal section is rotatable backward relative to the proximal section.

6. The pushchair seat according to claim 1, wherein the proximal section and the distal section are lockable against each other or wherein the proximal section and the seating surface are lockable against each other.

7. A pushchair system comprising a pushchair chassis and a pushchair seat for mounting on a pushchair chassis, wherein the pushchair seat comprises:
   a seating surface; and
   a backrest,
   wherein the backrest has a distal section and a proximal section rotatable relative to the distal section, such that the backrest is foldable from an unfolded backrest usage position to a folded backrest storage position,
   wherein the pushchair seat is configured such that a rotation of the distal section relative to the proximal section for folding the backrest occurs before a rotation of the proximal section relative to the seating surface for flattening the pushchair seat or a rotation of the distal section relative to the proximal section for folding the backrest occurs at least partially overlapping in time during a rotation of the proximal section relative to the seating surface for flattening the pushchair seat or a rotation of the distal section relative to the proximal section for folding the backrest occurs after a rotation of the proximal section relative to the seating surface for flattening the pushchair seat, and wherein in the backrest storage position, the proximal section is disposed between the distal section and the seating surface, and wherein a transfer of the backrest into the backrest storage position or a transfer of the proximal section into a proximal section storage position is carried out with the pushchair seat mounted on the pushchair chassis and without folding the pushchair chassis.

8. The pushchair system according to claim 7, wherein the pushchair seat is removably mounted from the pushchair chassis or is rotatable relative to the pushchair chassis about a substantially vertical axis.

9. The pushchair system according to claim 7, wherein the pushchair chassis is foldable.

10. The pushchair system according to claim 7, wherein the pushchair seat is configurable in a plurality of orientations on the pushchair chassis.

11. The pushchair system according to claim 7, wherein the pushchair seat in its entirety is rotatable relative to the pushchair chassis about a substantially horizontal axis when the pushchair chassis is folded.

12. The pushchair system according to claim 9, wherein the pushchair seat in the folded state is partially or completely receivable in an enveloping surface of the pushchair chassis.

13. A pushchair seat for mounting on a pushchair chassis, the pushchair seat comprising:
 a seating surface; and
 a backrest,
 wherein the backrest has a distal section and a proximal section rotatable relative to the distal section, such that the backrest is foldable from an unfolded backrest usage position to a folded backrest storage position,
 wherein the pushchair seat is configured such that a rotation of the distal section relative to the proximal section for folding the backrest occurs before a rotation of the proximal section relative to the seating surface for flattening the pushchair seat or a rotation of the distal section relative to the proximal section for folding the backrest occurs at least partially overlapping in time during a rotation of the proximal section relative to the seating surface for flattening the pushchair seat or a rotation of the distal section relative to the proximal section for folding the backrest occurs after a rotation of the proximal section relative to the seating surface for flattening the pushchair seat, and wherein in the backrest storage position, the proximal section is disposed between the distal section and the seating surface, and
 wherein the proximal section of the backrest is rotatably connected to the seating surface.

14. The pushchair seat according to claim 13, wherein the proximal section is rotatable relative to the seating surface of the pushchair seat, such that the proximal section can be transferred from an upright proximal section usage position to a flattened proximal section storage position.

15. The pushchair seat according to claim 13, wherein a length of the distal section is 0.5 to 1.5 times a length of the proximal section.

16. The pushchair seat according to claim 14, wherein the proximal section and the distal section in the backrest usage position enclose an angle of at least 170°, or the proximal section and the distal section in the backrest storage position enclose an angle of less than 20°.

17. The pushchair seat according to claim 13, wherein for folding into the backrest usage position the distal section is rotatable forward relative to the proximal section or the distal section is rotatable backward relative to the proximal section.

18. The pushchair seat according to claim 13, wherein the proximal section and the distal section are locked against each other or wherein the proximal section and the seating surface are locked against each other.

19. The pushchair seat according to claim 13, wherein a locking of the proximal section relative to the seating surface is adjusted or released by a rotation of the distal section relative to the proximal section or wherein a locking of the proximal section relative to the distal section is adjusted or released by a manual actuating device.

20. The pushchair seat according to claim 2, wherein the proximal section and the seating surface in the proximal section usage position enclose an angle of 90° to 180° , or wherein the proximal section and the seating surface in the proximal section storage position enclose an angle of more than 150° or less than 20°.

21. The pushchair seat according to claim 14, wherein the proximal section and the seating surface in the proximal section usage position enclose an angle of 90° to 180°, or wherein the proximal section and the seating surface in the proximal section storage position enclose an angle of more than 150°, or less than 20°.

22. A pushchair seat for mounting on a pushchair chassis, the pushchair seat comprising:
 a seating surface; and
 a backrest,
 wherein the backrest has a distal section and a proximal section rotatable relative to the distal section, such that the backrest is foldable from an unfolded backrest usage position to a folded backrest storage position,
 wherein the pushchair seat is configured such that a rotation of the distal section relative to the proximal section for folding the backrest occurs before a rotation of the proximal section relative to the seating surface for flattening the pushchair seat or a rotation of the distal section relative to the proximal section for folding the backrest occurs at least partially overlapping in time during a rotation of the proximal section relative to the seating surface for flattening the pushchair seat or a rotation of the distal section relative to the proximal section for folding the backrest occurs after a rotation of the proximal section relative to the seating surface for flattening the pushchair seat, and wherein the proximal section and the distal section in the backrest storage position lie at least approximately against each other, and wherein a locking of the proximal section relative to the seating surface is adjusted or released by a rotation of the distal section relative to the proximal section or wherein a locking of the proximal section relative to the distal section can be adjusted or released by a manual actuating device.

* * * * *

UNITED STATES PATENT AND TRADEMARK OFFICE
CERTIFICATE OF CORRECTION

PATENT NO. : 11,840,270 B2
APPLICATION NO. : 16/756786
DATED : December 12, 2023
INVENTOR(S) : Ralf Holleis Page 1 of 1

It is certified that error appears in the above-identified patent and that said Letters Patent is hereby corrected as shown below:

In the Claims

In Column 9, Line 20, in Claim 11, after "seat", delete "in its entirety"

Signed and Sealed this
Eighteenth Day of February, 2025

Coke Morgan Stewart
*Acting Director of the United States Patent and Trademark Office*